United States Patent
Boehm

(10) Patent No.: US 7,220,503 B2
(45) Date of Patent: May 22, 2007

(54) METHOD FOR OPERATING A FUEL CELL IN THE MINIMAL- OR PARTIAL-LOAD REGION

(75) Inventor: Gustav Boehm, Ueberlingen (DE)

(73) Assignee: DaimlerChrysler AG, Stuttgart (DE)

( * ) Notice: Subject to any disclaimer, the term of this patent is extended or adjusted under 35 U.S.C. 154(b) by 424 days.

(21) Appl. No.: 10/469,181

(22) PCT Filed: Feb. 14, 2002

(86) PCT No.: PCT/DE02/00526

§ 371 (c)(1),
(2), (4) Date: Feb. 12, 2004

(87) PCT Pub. No.: WO02/069427

PCT Pub. Date: Sep. 6, 2002

(65) Prior Publication Data

US 2004/0146756 A1    Jul. 29, 2004

(30) Foreign Application Priority Data

Feb. 27, 2001    (DE) ................................ 101 09 379

(51) Int. Cl.
*H01M 8/00*    (2006.01)
(52) U.S. Cl. ........................................................ 429/13
(58) Field of Classification Search .................... None
See application file for complete search history.

(56) References Cited

U.S. PATENT DOCUMENTS

| | | | | |
|---|---|---|---|---|
| 4,202,772 | A | 5/1980 | Goldstein | 210/232 |
| 5,366,821 | A | 11/1994 | Merritt et al. | 429/21 |
| 2002/0071981 | A1* | 6/2002 | Sano et al. | 429/30 |

FOREIGN PATENT DOCUMENTS

| | | | |
|---|---|---|---|
| DE | 19630842 | * | 11/1997 |
| EP | 0341189 | | 11/1989 |
| JP | 60230364 | | 11/1985 |
| JP | 61027071 | | 2/1986 |
| JP | 61027071 | A * | 2/1986 |
| JP | 07249419 | | 9/1995 |
| JP | 11067260 | A * | 3/1999 |

* cited by examiner

*Primary Examiner*—Dah-Wei Yuan
*Assistant Examiner*—Karie O'Neill
(74) *Attorney, Agent, or Firm*—Davidson, Davidson & Kappel, LLC

(57) ABSTRACT

The invention relates to a method for operating a PEM or DMFC fuel cell in the minimal- or partial-load region. According to the invention, the size of the cell surface, on which the fuel cell reaction takes place, is altered by means of opening or closing of feed channels, which serve to supply reaction medium to the cell surface.

16 Claims, 3 Drawing Sheets

METHOD FOR OPERATING A FUEL CELL IN THE MINIMAL-OR PARTIAL-LOAD REGION

BACKGROUND

The present invention relates to a method for operating a PEM (proton electrolyte membrane) or DMFC fuel cell (direct methanol fuel cell) in the minimal or part load range.

In fuel cell systems which have a large number of cells, problems occur with distributing the reaction media from cell to cell and within a cell in the minimal or part load range. On account of the smaller quantity of reaction media required in these load ranges, the active cell surface is under-supplied, resulting in cell failures. Moreover, there are moisture problems at the active cell surface since, on account of the low flow rate caused by the small quantity of reaction medium, it is impossible for sufficient water to be discharged from the fuel cell. To avoid these cell failures in the lower load ranges, the fuel cell systems are usually operated in higher load ranges and thereby with a greater quantity of reaction media than is necessary.

Furthermore, in the case of DMFC fuel cell systems, methanol breakthrough occurs in low load ranges. In the process, the fuel methanol diffuses through the active cell surface (membrane), with the result that the efficiency is reduced in this load operation.

SUMMARY OF THE INVENTION

It is an object of the invention to provide a method for operating a fuel cell with which the drawbacks of the prior art can be eliminated and stabilized operation of the fuel cell associated with a higher efficiency in the lower load range can be achieved.

The present invention provides a method for operating a fuel cell in a minimal or part load range wherein the fuel cell includes a cell surface at which a fuel cell reaction occurs and a plurality of passages for carrying at least one reaction medium and communicating with the cell surface. The method includes opening or closing at least one of the plurality of passages so as to change a size of the cell surface.

According to the invention, the size of the cell surface at which the fuel cell reaction takes place is changed by opening or closing supply passages which are used to supply one or both reaction media to the cell surface. In particular, the supply passages open out into passage regions which are formed into fluid distributor plates (also known as bipolar plates) of the fuel cell. In these passage regions of the fluid distributor plates, the reaction media supplied are transported to the cell surface.

By means of the method according to the invention, it is possible to open or close either the passage regions of the reactant or the passage regions of the oxidizing agent. Furthermore, however, it is also possible to open or close the passage regions of the two reaction media.

According to the invention, the size of the cell surface can be matched to the quantity of reactant and/or oxidizing agent which is required for a certain load state of the fuel cell. This prevents under-supply of the reaction media from occurring in certain areas of the cell surface when the fuel cell is operated in the lower load range. According to the invention, the reaction media flow only through the opened supply passages, which means that the fuel cell is optimally supplied with the small quantity of reaction media required for this lower load state of the fuel cell. This results in stable fuel cell operation and in an increase in the efficiency of the fuel cell.

A further advantage is that the methanol breakthrough in DMFC fuel cells is reduced by means of the inventive matching of the cell surface to the required quantity of reaction medium.

A further advantage of the present invention consists in the fact that the voltage spread at different load states can be reduced.

A load state is understood as meaning an operating state of a fuel cell or a fuel cell stack in which electric power is being taken from the fuel cell or the fuel cell stack. A load therefore corresponds to an electric power which is being taken off. Electric power (P), electric current (I) and electric voltage (U) are related to one another by means of the equation $P=U \cdot I$.

The term voltage spread is understood as meaning the difference between the voltage at full load and the voltage at zero load (fuel cell idling mode). The cause of the different voltages at different load states is the current density/voltage characteristic curve which is characteristic of a fuel cell (referred to for short as the i-U characteristic curve, cf. in this respect, by way of example, Larminie/Dicks, "Fuel Cell Systems Explained", Wiley 2001, pp. 37 ff.). The current density (i) is the current per unit area (A): $i=I/A$.

At low load, only a low current I, corresponding to a low current density i, flows. According to standard i-U characteristic curves, a high voltage is present at low current densities i; in the case where $i=0$, this voltage reaches the highest value, the so-called electromotive force (EMF). As the load increases and therefore as the current density increases, the voltage drops, which is caused by various overvoltages.

In the case of fuel cells or fuel cell stacks of the prior art, it is customary for the entire electrochemical active surface of a fuel cell to be operated. In this case, a higher demand for power is usually satisfied by increasing the current production of a fuel cell, in accordance with $P=U \cdot I$, which in turn is implemented by an increased supply of fuel. According to the i-U characteristic curve, the voltage thereby drops.

However, considerable voltage spreads are disadvantageous for the power electronics which usually control the removal of power from the fuel cells or fuel cell stacks, since certain electronic components of the power electronics may be damaged by rapid voltage changes. Furthermore, standard power electronics operate more effectively at approximately constant voltages and thereby contribute to an improved efficiency of fuel cells.

According to the invention, an increased demand for power from a fuel cell stack is not satisfied by increased current production on the part of the individual fuel cells, but rather by increasing the active surface area of the fuel cells. This allows the production of current by the fuel cells to be increased without the voltage dropping. This allows a considerable load spread at a low voltage spread.

It is also possible, at a reduced power demand, to reduce the size of the electrochemically active surface in the fuel cells. This has the advantage that the voltage does not rise to an undesirably high level as the current production drops, as is the case in the prior art. High voltages may have two drawbacks. Firstly, certain components of the power electronics may be damaged. Secondly, at particularly high voltages (e.g. settings with $i<<i_{max}$, where $i_{max}$ is the maximum current density of a fuel cell), the decomposition voltages of some materials used in the fuel cells may be reached or even exceeded, which leads to undesirable electrochemical corrosion to these materials.

According to the present invention, as the power demand drops, the fuel is removed from certain areas of the fuel cell, with the result that current and voltage drop to zero at these areas, whereas other areas continue to be operated approximately constantly, producing current and thereby generating a medium voltage. Damagingly high voltages are therefore avoided.

A further advantage is that the method according to the invention makes it possible to set a lower output voltage of a fuel cell stack for an approximately constant removal of power, which prevents the abovementioned disadvantageous effects of excessively high voltages on power electronics and with regard to electrochemical corrosion.

It is also advantageous that the method according to the invention, when used in fuel cell stacks which are connected in parallel in a fuel cell stack array, allows the output voltages of the individual fuel cell stacks to be matched to the same target value. This allows undesirable cross-currents between the individual fuel cell stacks to be avoided.

It is advantageously also possible for the supply passages leading to the cooling spaces of the fuel cell which are used to guide a cooling medium to be opened or closed. This changes the size of the active cooling surface which is in thermal contact with the cell surface.

In an advantageous embodiment of the invention, the supply passages leading to the cell surface are opened or closed by means of one or more displaceable perforated plates. A perforated plate in this case has apertures which are designed to match the arrangement of the supply passages. By displacing the perforated plates, it is possible to move the apertures in a perforated plate into alignment with the supply passages. In this case, the supply passages are open and it is possible to supply the corresponding passage regions and therefore the cell surface with the reaction media. A number of supply passages which is predetermined according to the apertures can be simultaneously closed or opened by means of the perforated plate. Therefore, the size of the cell surface is adjusted by opening and closing the supply passages and is thereby matched to the quantity of reaction media in the required load range of the fuel cell.

In a further advantageous embodiment of the invention, the supply passages leading to the cell surface are closed by means of a rotary blocking slide. Therefore, the supply passages can be opened or closed by rotating the rotary blocking slide.

It is advantageously also possible to close the discharge passages for discharging one or both reaction media from the cell surface. This prevents a reaction medium from flowing back out of a discharge passage to the cell surface which has already been closed by a closed supply passage. Moreover, it is advantageously also possible to close off the discharge passages for the cooling medium.

A preferred embodiment of the device according to the invention provides for plastic tubes with corresponding cutouts to be introduced inside one or more ports via which fuels or oxidizing agents are fed to a fuel cell stack. The tubes are mounted at the stack ends, for example using sliding bearings, and at one end are provided with a drive unit. This drive unit has to be able to rotate the tube through 0° to approximately 90° or, depending on the design of the port, through 180°, in order to block off 0 to approximately 90% of the supply passages into a fuel cell. This results in a power drop in a fuel cell from 100% to approximately 5%.

By means of the method according to the invention, it is possible to set the size of the cell surface in the range between 5% and 100% of its total size. This allows stable operation of the fuel cell at a high efficiency (especially in the case of DMFCs, by reducing the methanol breakthrough) even in the fuel cell load range of below 10%.

The present invention also relates to a method for operating a PEM or DMFC fuel cell stack in the minimal or part load range, in which method the size of the cell surface at which the fuel cell reaction takes place is changed by opening or closing supply passages which are used to supply one or both reaction media to the cell surface.

The method allows the fuel cell stack to operate stably and allows the efficiency of the fuel cell stack to be increased, in particular in the case of DMFCs.

An advantageous variant of the method according to the invention provides for the supply of one or both reaction media to be interrupted at zero load, i.e. at i=0, and for the fuel cell stack to be electrically short-circuited at the same time.

This has the advantage that high voltages, such as for example idling voltages, which at zero load may exceed the decomposition voltages of materials used, cannot form, and it is therefore possible to prevent electrochemical corrosion of components of the stack.

The cause of the abovementioned idling voltages at zero load is that after the fuel cell stack has been operating under load, reaction media are still present in the individual fuel cells and may continue to react electrochemically, thereby setting the idling voltage.

According to the method of the invention, therefore, it is preferred for the fuel cell stack to be short-circuited at zero load after a load has been present, in order to reduce voltages which are present, and for the supply of one or both reaction media to be interrupted, in order to prevent the electrochemical reaction from continuing.

The short circuit can be executed by means of a suitable device, for example a switch in a short-circuit line and a discharge resistor.

A further advantageous variant of the method according to the invention provides for not only the supply of one or both reaction media to be interrupted at zero load, i.e. at i=0, and for the fuel cell stack to be electrically short-circuited at the same time, but also for the discharge of one or both reaction media to be interrupted.

The simultaneous interruption of supply and discharge passages may be required in particular when hydrogen is used as fuel, since otherwise a supply from the output side is possible. This is because the reacting hydrogen can generate a vacuum, by means of which further fuel is sucked in from the output side. The same can be true of the cathode side, in particular if pure oxygen is being used. In the case of operation with reformate gas, for example with an $H_2$ content of 50 to 60% by weight, and with air, the level of inert components in the gas ensures that this effect is greatly reduced.

It is also preferred if the interruption to the supply and/or discharge of one or both reaction media is effected by closing all the supply and/or discharge passages.

This has the advantage that switching off at zero load can take place very quickly and without unnecessary fuel consumption, which further increases the efficiency of the fuel cell stack.

To open or close the discharge passages, it is in principle possible to provide the same means as those used to open or close the supply passages.

BRIEF DESCRIPTION OF THE DRAWING

The invention is explained in more detail below on the basis of drawings and with reference to examples. In the drawings.

DETAILED DESCRIPTION

Figure 1:
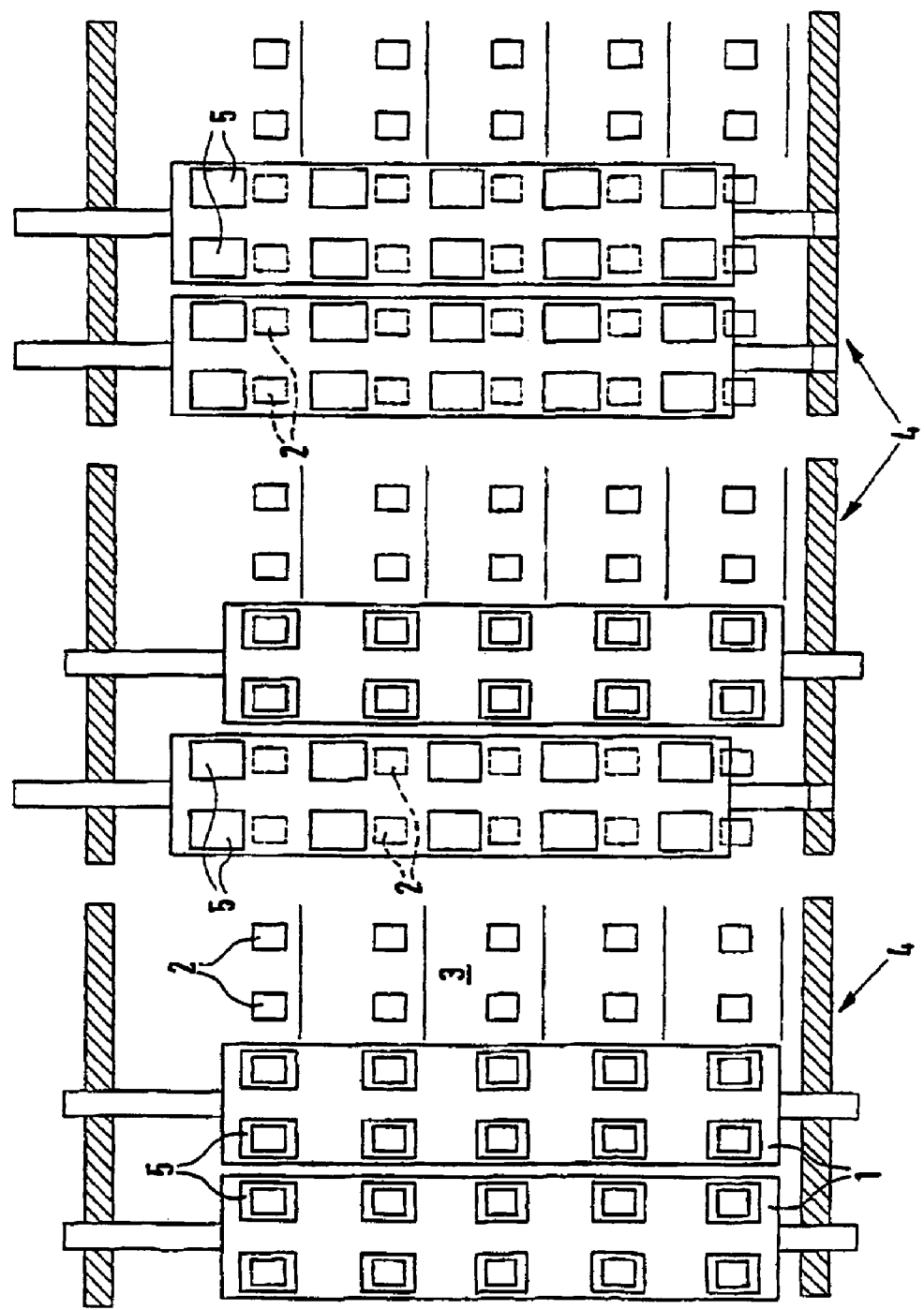
FIG. 1 shows a first exemplary embodiment for carrying out a method according to the invention by means of displaceable perforated plates, in three different operating positions.

FIG. 1 shows a first exemplary embodiment for carrying out a method according to the invention by means of displaceable perforated plates 1. This figure illustrates a sectional view, from the side, through a fuel cell stack 4. The fuel cell stack 4 is formed by stacking a plurality of fluid distributor plates 3. Passage regions (not shown), which are used to distribute the reaction media to the active cell surface (not shown), are formed in the fluid distributor plates 3. An active cell surface is understood as meaning in particular a membrane electrode assembly, also known as MEA for short. An MEA comprises an anode, a cathode and a proton-conducting electrolyte membrane arranged between the anode and cathode. Proton transport from the anode to the cathode is ensured by means of the proton-conducting electrolyte membrane (PEM). The MEA is in this case arranged between the fluid distributor plates 3 which are supplied with the reaction media from the supply passages 2.

The supply passages 2 and therefore the access to the corresponding passage regions are closed off by means of perforated plates 1. The perforated plates 1 are arranged perpendicular to the fluid distributor plates 3 and therefore perpendicular to the supply passages 2. The perforated plates 1 have apertures 5 which are designed to match the arrangement of the supply passages 2. By displacing a perforated plate 1, it is possible to align the apertures 5 in the perforated plate 1 with the supply passages 2, with the result that it is possible to supply the corresponding passage region and therefore the active cell surface. If the apertures 5 in the perforated plate 1 are not aligned with the supply passages 2, the corresponding passage regions are closed off and the active cell surface is not supplied with reaction medium.

The left-hand illustration in FIG. 1 shows an arrangement of the perforated plates 1 in which the apertures 5 of the individual perforated plates 1 are aligned congruently with the supply passages 2.

Therefore, the entire passage region in the individual fluid distributor plates 3 of the fuel cell 4 is open and can be supplied with the reaction media.

In the middle illustration in FIG. 1, the left-hand perforated plate 1 has been displaced in such a manner that the apertures 5 in the perforated plate 1 are not aligned with the corresponding supply passages 2 (shown in dashed lines). In the excerpt illustrated, therefore, ⅓ of the supply passages 2 are closed off and the reaction media are not flowing through them.

The right-hand illustration in FIG. 1 shows that further supply passages 2 are closed off by displacing the second perforated plate 1. Therefore, in this illustration, only ⅓ of the supply passages illustrated are opened, allowing the reaction media to be passed into the passage regions of the individual fluid distributor plates 3 and therefore to the active cell surface.

Figure 2:
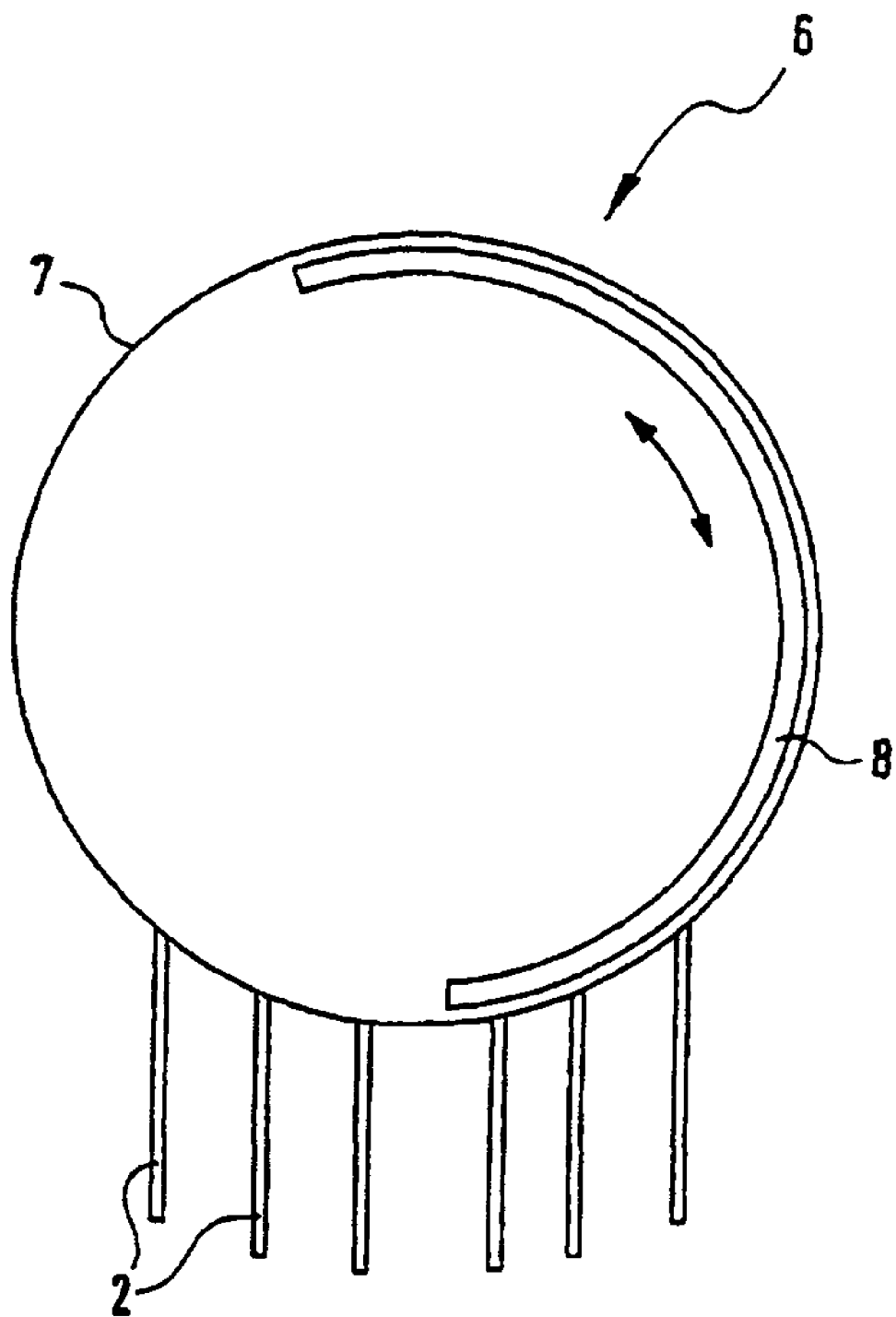
FIG. 2 shows a further exemplary embodiment for carrying out a method according to the invention by means of a rotary blocking slide.

FIG. 2 illustrates a further exemplary embodiment for carrying out the method according to the invention. In this case, a rotary blocking slide 6 is illustrated in plan view. The supply passages 2 are connected to the rotary blocking slide 6, the openings of the supply passages 2 being successively opened or closed by rotation of the rotary blocking slide 6. It is possible to supply the active cell surface through the open supply passages 2.

From the outer tube 7 of the rotary blocking slide 6 illustrated in FIG. 2, a plurality of supply passages 2 branch off to the passage regions of the fuel cell and to the active cell surface (not shown). An arc segment of an inner tube 8, which is formed over a predetermined angular range, is arranged inside the outer tube 7 of the rotary slide 6. The outer radius of the arc segment of the inner tube 8 corresponds to the inner radius of the outer tube 7, the inner tube 8 being mounted rotatably inside the outer tube 7. By rotating the arc segment of the inner tube 8, it is possible to open or close the supply passage 2 leading to the passage regions of the fuel cell. A supply passage 2 is closed when the arc segment of the inner tube 8 covers this supply passage 2. If the arc segment of the inner tube 8 is moved away past the opening of the supply passage 2 by being rotated, the supply passage 2 is open.

Of course, the embodiments of the supply passages explained in FIG. 1 and FIG. 2 can also be carried out for the discharge passages.

Figure 3:
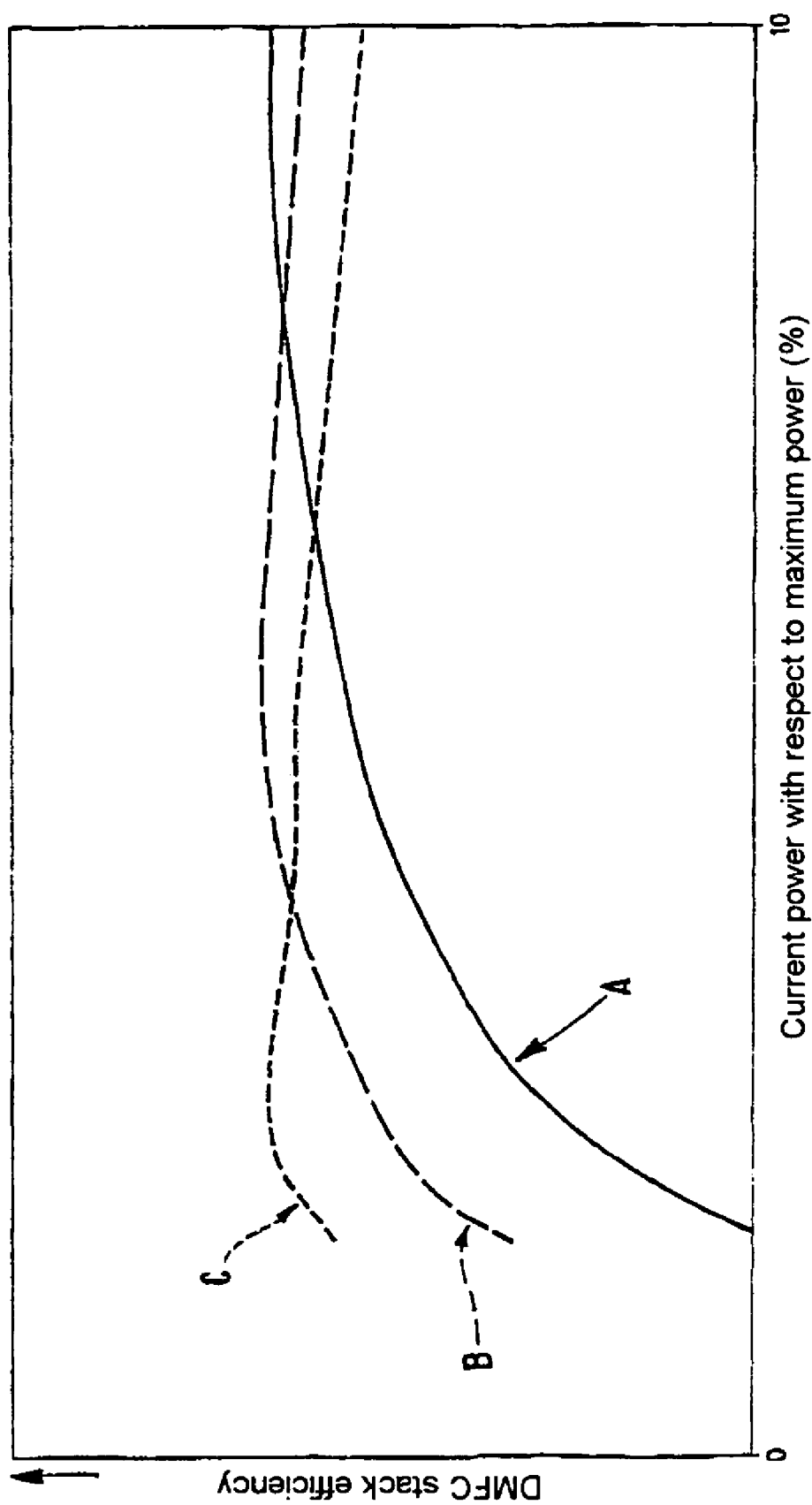
FIG. 3 shows an example comparing the efficiency of a DMFC fuel cell in the lower load range with its full cell surface active compared to a reduced active cell surface.

FIG. 3 illustrates the efficiency of a DMFC fuel cell with respect to the power of the fuel cell, considering only the load range below 10% of the maximum power. FIG. 3 shows how a reduced active cell surface area in the lower power range affects the efficiency of the fuel cell.

In the illustration, A represents the curve of the efficiency of a fuel cell in which the reaction media flow onto the entire cell surface in the lower power range under consideration. In this case, the efficiency drops greatly below a power of approximately 8% of the maximum power. By contrast, the efficiencies with a reduced active cell surface area are considerably higher.

Curve B shows the profile of the efficiency for a fuel cell in which ⅔ of the active cell surfaces is being supplied with the reaction media. The efficiency of this fuel cell, below a fuel cell power of approximately 8%, is significantly higher than the efficiency of a fuel cell as represented by curve A and only drops significantly below a power of 5%.

If the active cell surface area is reduced to ⅓ of the total surface area of the active cell surface (curve C), the efficiency of a fuel cell of this type below a power of approximately 7% is significantly greater than the efficiency as represented by curve A, and below a power of approximately 5% is even significantly greater than the efficiency as represented by curve B. The efficiency (curve C) of this fuel cell only drops at a power of 2%.

A significantly higher efficiency can be achieved in the lower load ranges of a fuel cell by means of the method according to the invention of reducing the active cell surface.

The invention claimed is:

1. A method for operating a fuel cell in a minimal or part load range, the fuel cell including an active cell surface at which a fuel cell reaction occurs and a plurality of supply passages for carrying at least one reaction medium and communicating with the active cell surface and a plurality of discharge passages discharging the at least one reaction medium from the active cell surface, the method comprising:
  opening or closing the plurality of supply passages so as to change a size of the active cell surface; and
  opening or closing the plurality of discharge passages.

2. The method as recited in claim 1 wherein the fuel cell is a PEM or DMFC fuel cell.

3. The method as recited in claim 1 wherein the fuel cell includes an active cooling surface disposed in thermal contact with the active cell surface and a plurality of coolant supply passages for supplying a cooling medium to the active cooling surface and wherein the method further comprises opening or closing at least one of the plurality of coolant supply passages so as to change a size of the active cooling surface.

4. The method as recited in claim 1 wherein the opening or closing is performed using at least one displaceable perforated plate.

5. The method as recited in claim 1 wherein the opening or closing is performed using at least one rotary blocking slide.

6. The method as recited in claim 1 wherein the size of the active cell surface is capable of being adjusted by 5% and 100% of a maximum active cell surface size.

7. The method as recited in claim 1 wherein the passages are supply passages for supplying the at least one reaction medium to the cell surface.

8. The method as recited in claim 1 wherein the passages are discharge passages for discharging the at least one reaction medium from the cell surface.

9. The method as recited in claim 1 wherein the opening or closing includes only closing.

10. The method as recited in claim 1 further comprising interrupting a supply of the at least one reaction medium when a load of the fuel cell is zero so as to electrically short-circuit the fuel cell.

11. The method as recited in claim 10 wherein interrupting includes interrupting both the supply and a discharge of the at least one reaction medium.

12. The method as recited in claim 10 wherein the interrupting is performed by closing all of the plurality of passages.

13. A device for operating a fuel cell in a minimal or part load range comprising:
  a active cell surface configured to accommodate a fuel cell reaction;
  a plurality of supply passages for carrying at least one reaction medium and communicating with the active cell surface;
  a plurality of discharge passages for discharging the at least one reaction medium from the active cell surface; and
  an active cell surface adjustment device configured to open or close the plurality of supply passages and to open or close the plurality of discharge passages.

14. The device as recited in claim 13 further comprising:
  a cooling surface disposed in thermal contact with the active cell surface;
  a plurality of coolant passages for carrying a cooling medium and in communication with the cooling surface; and
  a cooling surface adjustment device configured to open or close at least one of the plurality of coolant passages.

15. The device as recited in claim 13, wherein the active cell surface adjustment device includes at least one of a perforated plate and a rotary slide disposed adjacent the plurality of passages.

16. The device as recited in claim 14, wherein the cooling surface adjustment device includes at least one of a perforated plate and a rotary slide disposed adjacent the plurality of coolant passages.

* * * * *